3,226,744
APPARATUS FOR ASSEMBLING SCREW BLANKS AND WASHERS
Adrien Marechal and Jacques Paineau, Paris, France, assignors to Societe Rivex, Paris, France, a French joint-stock company
Filed Oct. 31, 1963, Ser. No. 320,353
Claims priority, application France, Nov. 7, 1962, 914,721
7 Claims. (Cl. 10—155)

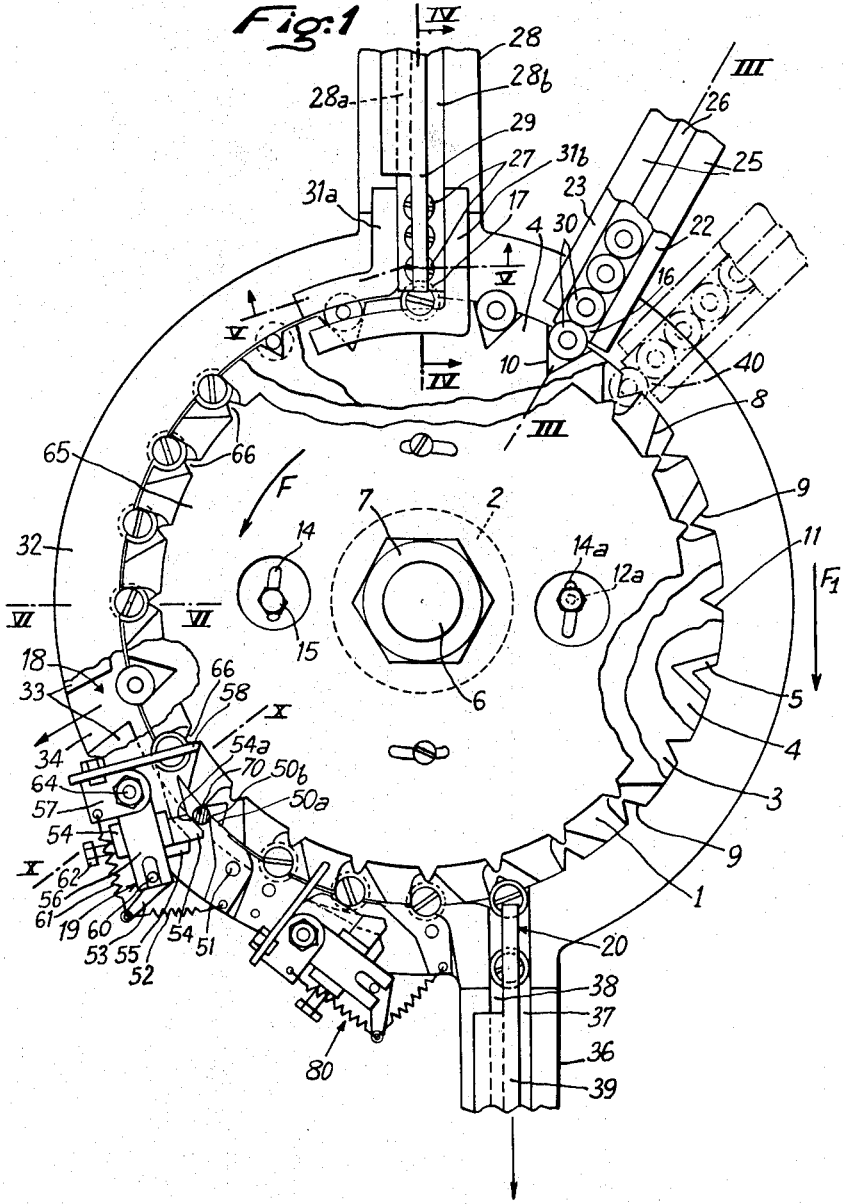

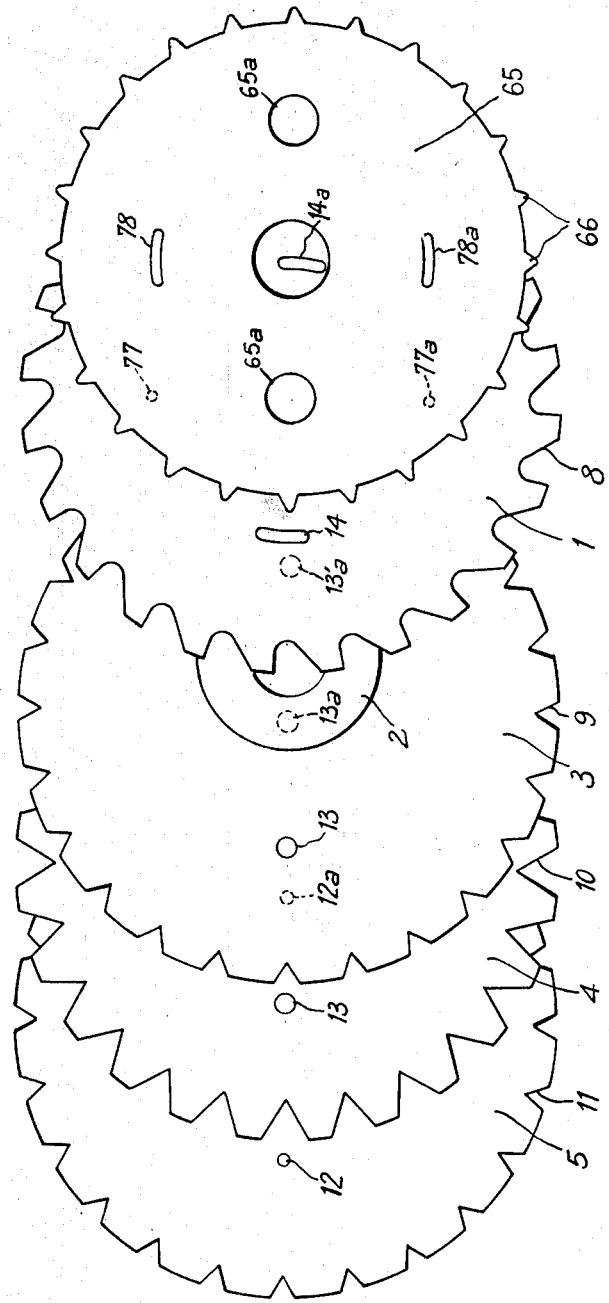

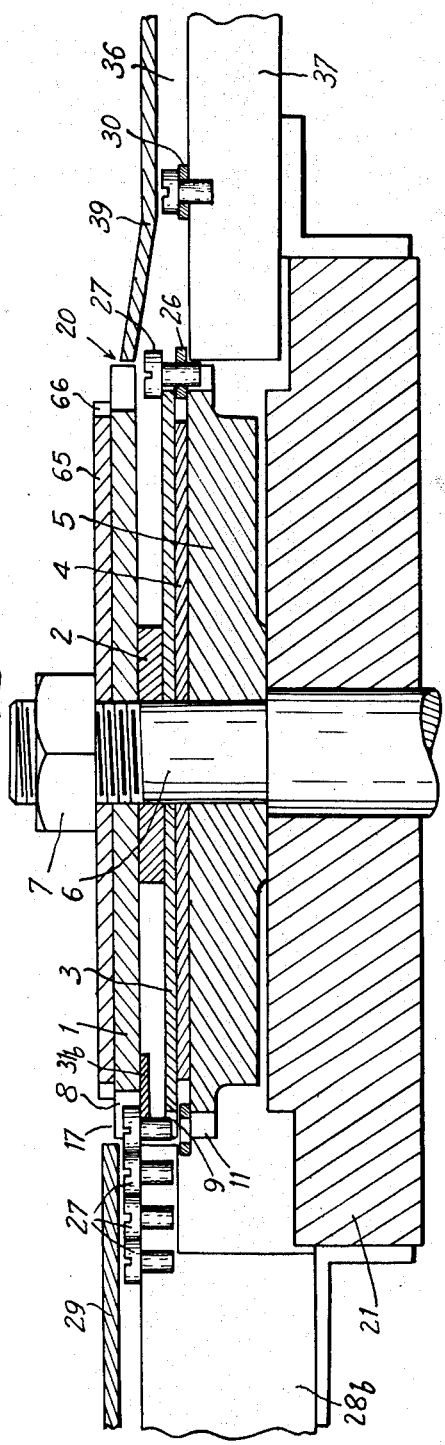

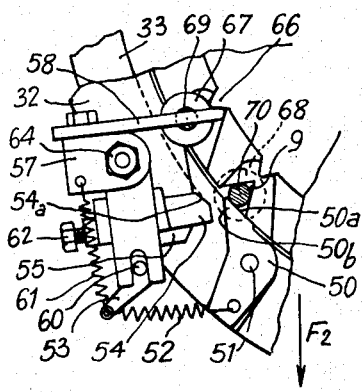
Fig. 7
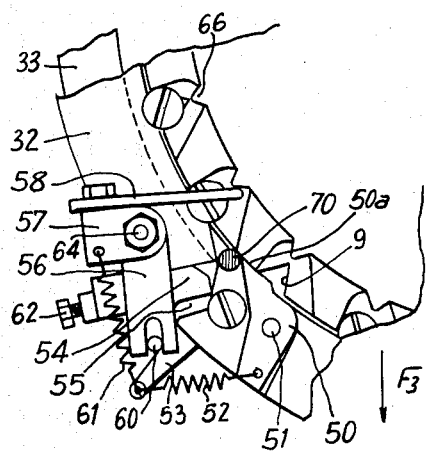
Fig. 8
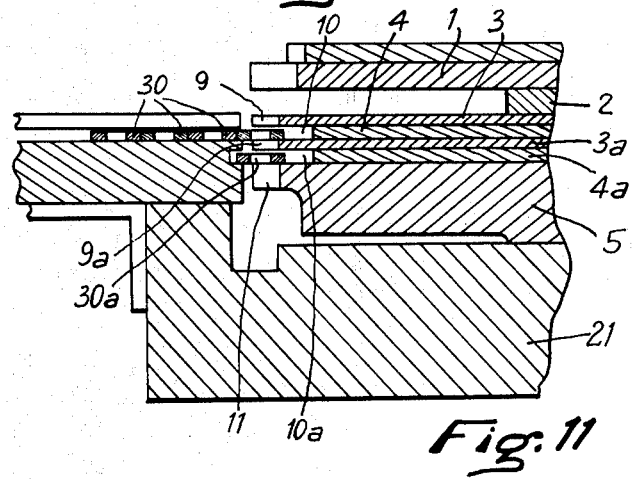
Fig. 9
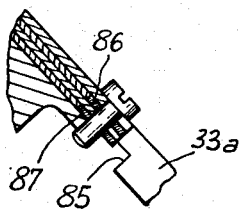
Fig. 10
Fig. 11

This invention relates to an improved machine for inserting washers on screw blanks in a continuous operation.

Screws and bolts provided with so-called non-losable washers forming a permanent assembly are well-known in the art. When such assemblies are used it is no longer necessary to insert the washers over the securing members at the moment of their fitting in situ. This leads to a substantial shortening of the time required for assembling the parts, particularly in the case of mass production.

Geneally speaking, the washers are inserted over the blanks before threading. Thereafter, the blank and washer assemblies are fed into the threading apparatus where the threads may be formed e.g. by rolling. The threads are designed in such a manner as to prevent the washers from falling off the screws.

Various means, methods and machines have been proposed for inserting the washers on the blanks and conveying the assembled blanks and washers into the thread-forming machine. Some threading machines of this type operate intermittently: one of the components of the assembly (either the blank or the washer) is stationary, while the other component is brought into a registering with the former component, and the washer is stopped in this position during a predetermined period while the insertion is carried out. This method has the drawback of limiting considerably the sequential speed of production. In other known types of machines, the two components constituted by the blank and the washer are advanced continuously along different paths having an intersection where the insertion is performed very rapidly. In such systems difficulties have arisen regarding the the simultaneous distribution of the blanks and the washers and the perfect synchronism of the two movements. These difficulties have not been completely overcome so far.

The above noted difficulties made it necessary to reduce the sequential speed of operation of the machine inserting the washers on the blanks despite the fact that the new speed fell below the possible speed of operation of modern thread-cutting machines.

It is therefore an object of this invention to eliminate entirely the above noted difficulties by increasing substantially the length of the path along which the insertion of the washer takes place. This makes possible not only an increase in the sequential speed of production, but also leads to a reduction in waste, that is reduction in the percentage of blanks without washers.

The invention will be better understood from the ensuing detailed specification taken in conjunction with the drawing, wherein:

FIG. 1 is a plan view of the machine;
FIG. 2 is an exploded view showing the discs forming the stack of FIG. 1;
FIG. 3 is a view taken along line III—III across the washer-feeding station of FIG. 1;
FIG. 4 is a view taken along line IV—IV of FIG. 1;
FIG. 5 is a view taken along line V—V of FIG. 1;
FIG. 6 is a view taken along line VI—VI of FIG. 1;
FIGS. 7 and 8 are plan views illustrating, during two different stages of operation, details of the safety mechanism ejecting a blank carrying no washer;
FIG. 9 is a view similar to FIG. 3 showing another embodiment with modified stack of discs defining two washer feeding stations;
FIG. 10 is a view taken along line X—X of FIG. 1 of a blank-ejecting station, the stack being adapted to insert two washers on each blank; and
FIG. 11 is a view similar to FIG. 10 showing a different operation.

In the embodiment illustrated, the improved machine includes a disc stack disposed in a plane sloping downwardly in the direction of arrows $F_1$, $F_2$ and $F_3$ shown in FIGS. 1, 7 and 8, respectively. Referring particularly to FIGS. 1 and 2, the stack includes five discs 1, 2, 3, 4, 5 fastened to the common spindle 6 by the nut 7. The disc 2 serves merely for raising the disc 1 above the disc 3 and its thickness is slightly less than the length of the shanks of the screw blanks. The disc 1 is provided with U-shaped peripheral notches 8 of which the leading side is inclined in the direction of rotation of the disc, facilitating the engagement of the notch with a blank head. The trailing side of the notch is substantially radial and serves for carrying the blank head. The disc 3 is provided with V-shaped notches 9 engaging and carrying the blank shanks. The disc 4 is provided with V-shaped notches 10 which are larger than the notches 9 and are adapted to engage and carry the washers.

Finally, the disc 5 is provided with notches 11 identical with the notches 9 in the disc 3 and adapted to engage and carry the blank shanks after the washers have been inserted thereon. The notches in the discs 3, 4, 5 have common planes of symmetry extending radially with reference to the spindle 6, whereas the angular position of the disc 1 is adjusted in such a manner that the trailing edge of notches 8 is adapted to drive the blank heads while their shanks are held in the above-mentioned radial planes of symmetry. To this end, the lowermost disc 5 is provided with two studs 12 and 12a adapted to enter the ports 13 and 13a of the discs 3 and 4 and to engage the arcuate slots 14 and 14a in the disc 1. Thus, the notches of the discs 1, 3, 4 and 5 are aligned and the discs are rigidly secured together by nut 15 threaded on stud 12. The stack also includes an uppermost disc 65 provided with peripheral cam-shaped projections corresponding in number to the notches in the other discs. Disc 65 is angularly adjustable with reference to the other discs. The angular adjustment is limited by the dimensions or arcuate slots 78, 78a through which extend studs 77 and 77a carried by the disc 1. Openings 65a in the disc 65 register with studs 12 and 12a and provide access thereto.

The stack is driven as a unit by suitable mechanical means and revolves in the direction of the arrow F inside a frame 21. Thus, the notches register in succession with the various feeding and ejecting stations 16, 17, 18, 19 and 20. At station 16, as shown in FIGS. 1 and 3, there is disposed a channel for feeding washers by gravity. The channel ends in registry with the disc 4; thus, each notch 10 in said disc receives a washer 30, as the latter slides down between two slideways 22 and 23 and enters the plane defined by the disc 4 over a plate 24. An overlapping of two washers is prevented by the cover 25 provided with a slot 26 through which the washers are accessible in the case of wedging.

At station 17 (FIGS. 1 and 4), there ends a channel for feeding screw blanks 27 by means of gravity. The head of the blanks 27 located at the level of the disc 1 enters the notches 8 and the ends of the blank shanks enter the notches 9 in the disc 3. Blank heads 27 are guided between the slideway sides 28a, 28b, bottom 28 and cover 29.

At the discharge end of the channel for feeding the blanks to station 17, the blank heads slide on a ramp (FIGS. 1 and 5) which is constructed by two blades 31a and 31b forming extensions of sides 28a and 28b of the slideway 28. At the periphery of disc 1 the blades 31a and 31b extend in the direction of the rotation of the disc stack and slope downwardly to the level of disc 3. The blanks are driven along the slope by the rotating stack, the notches 8 of the disc 1 acting on the blank heads and the notches 9 of the disc 3 acting on their shanks, each blank remaining perpendicular to and coaxial with the corresponding washer carried by the notch 10 in the disc 4 forming part of the same group of notches. During its movement over the inclined ramp, under the action of gravity, the blank shank engages gradually the washer 30 until the moment the blank head abuts the disc 3. The end of the shank is then received by the notch 11 of the disc 5. If the insertion of the washer is not completed at the discharge end of the ramp, it may be finished during the period prior to the passage of the blank in front of the washer-ejecting station 32 (FIG. 1), under the action of the natural vibrations of the machine or of vibrations which may be produced systematically through any suitable means.

After the insertion of the washer over the shank, the washer and blank assembly is driven into rotation by the notches 9, 10 and 11 formed respectively in the discs 3, 4 and 5. Any washer which has not been inserted over a blank continues being driven by the notch 10 in the disc 4, while any blank which has not been provided with a washer is carried by the notches 9 and 11 of the disc 3 and 5. During the angular movement of the stack between the stations 16, 17 and 20, the separate washers and blanks and the washer and blank assemblies are held in the cooperating notches by the arcuate sectors 32, 33 and 34 (FIG. 6) extending along the peripheries of the corresponding discs 3, 4 and 5 and secured to the frame 21 by bolts 35. The sector 33 is provided with a gap at the location 18 where gravity causes the ejection of the washers which have not been inserted over a shank. The other washers are held against dropping by the screw blanks themselves which, on the other hand, are held by the other sectors 32 and 34. The three sectors 32, 33 and 34 are all provided with a gap in registry with the station 19 so as to allow the ejection of the blanks which are not provided with washers as will be described and explained hereinafter. Finally, the blank and washer assemblies are ejected by gravity at the station 20 (FIG. 1) and are fed into a thread-forming machine (not shown) through a channel 36 formed by two slideways 37, 38 and a corresponding cover 39.

At the station 19, within the gap in the sectors 32, 33, 34 there is disposed a nose 50 adapted to rock about a spindle 51 (FIGS. 1, 7 and 8). A spring 52, anchored at one end to the rod 53 rigid with the frame, urges permnaently the tail-piece 50a of the nose 50 into contact with the periphery of the stack. The tail-piece 50a has a length greater than that of the notches 9 of the disc 3 with which nose 50 is coplanar. Thus, the tip 50b of the nose 50 cannot engage an adjacent notch 9. The station 19 further includes an ejecting finger 54 slidingly carried by a block 55 and carrying a stud 60 engaging a fork 56 rigidly secured to a member 57. Member 57, in turn, is pivotally secured to a stud 64 and carries a control lever 58. Member 57 is subjected to the action of a tensioned spring 61, one end of which is secured to the stationary rod 53.

The ejecting finger 54 also carries an adjustable screw 62 engaging the stationary block 55 so as to limit to a suitable value the maximum stroke of the finger. Finger 54 is also provided, in registry with the stack, with a taper 54a (FIG. 7) adapted to form an extension of the sector 33 holding the washers against the stack.

The control lever 58 cooperates with the cams 66 on the disc 65 in that as a cam 66 passes in registry with the lever 58, the latter is tilted, causing a receding movement of the finger 54 (FIG. 8). The disc 65 is angularly adjusted in such a manner that said receding movement occurs immediately after the engagement of the blank shank with the nose 50.

The operation of this blank-ejecting system is as follows:

When a screw blank with a washer inserted over its shank appears in ejecting station 19, gravity holds the washers in contact with the guiding sector 33. In this position, the blank shanks 67 and 70 (FIG. 7) are held by their washers 67 and 68 in a position such that the path followed by their axis passes between the stack and the tip of the nose 50. The latter rises slightly during the passage of the blank against the tension of the spring 52 and it urges the blank shanks into bottom of the notch 9. Thus, no ejection takes place and the blank and washer assembly moves beyond the gap towards station 20.

On the contrary, if a blank 70 enters the station 19 without a washer, it engages by gravity the sector 33 in the position illustrated in FIG. 1. The path now followed by the blank axis passes outside the tip 50a of the nose 50 with references to the stack. After engaging under the action of gravity the taper 54a of the finger 54, the blank shank 70 enters the position illustrated in FIG. 8. The shank 70 contacts the outer surface of the nose 50 which deflects it outwardly. The cooperation of the nose 50 with the notch 9 of rotating disc 3 urges slightly the finger 54 against the action of the tensioned spring 61 with the interposition of the blank shank, so that the latter remains wedged between finger 54 and the periphery of the stack until the passage of the cam 66 over the control lever 58 causes the ejecting finger 54 to recede, actuated by the fork 66. The discharge opening 15 is thus uncovered and the blank drops out by gravity.

FIG. 9 shows a washer-feeding station designed to insert two washers over the same blank. In this case, the machine is provided with a second washer-feeding station 40 identical with that described precedingly and illustrated in dot-and-dash lines in FIG. 1. The stack includes, in addition to the discs 1, 2, 3, 4, 5, two further discs 3a and 4a between the discs 4 and 5. The notches 9a of the disc 3 are identical with the notches 9 of the disc 3 and the notches 10a of the disc 4a are identical with those of the disc 4. The station 40 feeds the washers 30a into the notches 10a of the disc 4a and the station 16 then supplies washers 30 entering the notches 10 in the disc 4. The insertion of the blanks is performed in the same manner as before. The notches 9a of the disc 3a are adapted to guide and carry the blank shanks between the insertion of the first washer and that of the second washer.

When the machine is equipped with a second washer-carrying disc for allowing the simultaneous insertion of two washers on each blank, as illustrated in FIG. 9, it is necessary to remove not only the blanks which have not received any washer, but also those which have received only one. To this end, the machine is equipped with a second washer-ejecting station 80 located beyond the first ejecting station 19 as shown in FIG. 1. Each of the two washer-ejecting stations 19 and 80 is provided, as before with a gap across the guiding sectors so as to allow the ejection to take place. The structure of the two stations is similar to that described hereinabove with the difference that one of the two washer-guiding sectors is provided with an additional gap at a short distance from the nose. This second gap also registers with the ejecting finger. Consequently, even if the blank is provided with one washer, it engages nevertheless the guiding sector associated with the missing washer in the position illustrated in FIGS. 1 and 8. Thus, the ejection of the blank is ensured.

FIGS. 10 and 11 illustrate in partial cross-section a station equipped to check the presence of the upper washer.

In said figures, the guiding sector, associated with both washer discs for sake of simplifying the structure, is milled at 85 so as to leave only that part of the sector 33a uncut just ahead of the gap extending through all the sectors which part registers with the disc carrying the washer to be checked.

In the example illustrated in FIG. 10, the blank shank carries two washers 86 and 87, the washer 86 engaging sector 33a and thus holding the shank against the bottom of the disc notch. On the contrary, it is assumed in FIG. 11 that the blank carries only the washer 87, so that the blank shank engages, under the action of gravity, the guiding sector 33a. This is similar to the case illustrated in FIG. 8 and consequently the blank is ejected.

Although only two embodiments of the invention have been depicted and described, it will be apparent that these embodiments are illustrative in nature and that a number of modifications in the apparatus and variations in its end use may be effected without departing from the spirit or scope of the invention as defined in the appended claims.

What we claim is:

1. A machine for inserting washers on screw blanks each having a head and a shank, comprising,
   (a) a conveyor means,
   (b) a plurality of spaced notch groups associated with said conveyor means and carried thereby, each group formed by a plurality of superimposed aligned notches,
   (c) head carrying means associated with each group and moving therewith as a unit,
   (d) at least one washer feeding station to insert a washer each into a notch aligned with the discharge end of said washer feeding station as said notch groups successively register therewith,
   (e) a blank feeding station for inserting a screw blank into each of said groups in a position where the blank shank extends downwardly and the lower end thereof is centered with and disposed immediately above the washer or washers held in the same group and the periphery of the blank head is engaged by said carrying means associated with said group,
   (f) a ramp stationary with respect to said blank feeding station and projecting into said notch group under the level of said head carrying means and adapted to hold said blank in suspension by engaging the underside of the blank head, said ramp extending along the path of travel of said group in a downward sloping direction causing the blank, driven by said head carrying means during the advancement of the notch group from the blank feeding station, to slide along the ramp and, while gradually being displaced within the notch group, engage said washer and the notch disposed adjacent thereto, and
   (g) a discharge station where the blank and washer assembly is removed from each of said notch groups.

2. A machine as defined in claim 1, wherein said head carrying means includes a notch, the trailing end of which is adapted to drivingly engage the periphery of said blank head while said blank is being gradually displaced by gravity within the notch group.

3. A machine as defined in claim 2, wherein said conveyor includes a plurality of discs assembled into a stack disposed in an inclined plane and rotatable as a unit, each disc being provided with a plurality of peripheral notches to form said plurality of notch groups and said head carrying means.

4. A machine as defined in claim 3, including an ejecting station for removing radially outwardly from said groups blankless washers and at least one ejecting station for removing radially outwardly from said groups blanks, having less than the predetermined number of washers thereon, said ejecting stations being disposed after said washer feeding and blank feeding stations and before said assembly discharge station.

5. A machine as defined in claim 3, including a plurality of superimposed stationary arcuate sector parts extending along the periphery of said stack, the edge of said sectors facing said stack adapted to engage the side of said blanks and said washers to prevent them from accidentally dropping out by gravity from said notch groups.

6. A machine as defined in claim 5, wherein a length of the sector part engaging said washers disposed in said notch groups is omitted after said washer feeding and blank feeding stations to cause all blankless washers to drop out radially outwardly from said notch groups.

7. A machine as defined in claim 5, wherein a length of the sector engaging said shanks disposed in said notch groups is omitted after said washer feeding and blank feeding stations to cause all washerless blanks to drop out radially outwardly from said notch groups.

References Cited by the Examiner

UNITED STATES PATENTS

| | | | |
|---|---|---|---|
| 2,914,781 | 12/1959 | Prutton | 10—155 |
| 3,024,523 | 3/1962 | Donaldson | 10—169 |
| 3,114,159 | 12/1963 | Yoshikawa | 10—155 |
| 3,155,993 | 11/1964 | Stern | 10—169 |

ANDREW R. JUHASZ, *Primary Examiner.*